(12) United States Patent
Horng et al.

(10) Patent No.: US 7,830,048 B2
(45) Date of Patent: Nov. 9, 2010

(54) MICRO MOTOR

(75) Inventors: Alex Horng, Kaohsiung (TW); I-Yu Huang, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 227 days.

(21) Appl. No.: 12/081,421

(22) Filed: Apr. 16, 2008

(65) Prior Publication Data
US 2009/0243427 A1 Oct. 1, 2009

(30) Foreign Application Priority Data
Mar. 27, 2008 (TW) ................. 97110921 A

(51) Int. Cl.
*H02N 1/00* (2006.01)
*H02K 7/08* (2006.01)
(52) U.S. Cl. .................... 310/40 MM; 310/90; 310/309
(58) Field of Classification Search ........... 310/40 MM, 310/309
See application file for complete search history.

(56) References Cited

U.S. PATENT DOCUMENTS

| | | | | |
|---|---|---|---|---|
| 5,043,043 A * | 8/1991 | Howe et al. | .................... | 216/17 |
| 5,111,693 A * | 5/1992 | Greiff | ...................... | 73/514.35 |
| 5,149,397 A * | 9/1992 | Bol | ................ | 216/2 |
| 5,164,688 A * | 11/1992 | Larson | ......................... | 333/33 |
| 5,191,251 A * | 3/1993 | Paratte | ...................... | 310/309 |
| 5,252,881 A * | 10/1993 | Muller et al. | ............... | 310/309 |
| 5,428,259 A * | 6/1995 | Suzuki | ....................... | 310/309 |
| 5,493,156 A * | 2/1996 | Okada | .................. | 310/40 MM |
| 6,087,747 A * | 7/2000 | Dhuler et al. | ................. | 310/90 |
| 6,191,518 B1 * | 2/2001 | Suzuki | ....................... | 310/309 |
| 6,472,794 B1 * | 10/2002 | Shibaike et al. | ............. | 310/309 |
| 6,649,947 B2 * | 11/2003 | Rodgers et al. | ............. | 257/252 |
| 6,784,592 B2 * | 8/2004 | Hartwell | ..................... | 310/309 |
| 7,239,054 B2 * | 7/2007 | Takada et al. | ......... | 310/40 MM |
| 7,504,275 B2 * | 3/2009 | Horng et al. | .................. | 438/52 |
| 2008/0280231 A1 * | 11/2008 | Horng et al. | ................ | 430/312 |
| 2009/0051243 A1 * | 2/2009 | Horng et al. | ................ | 310/309 |

OTHER PUBLICATIONS

Y Kanamori et al. "Fiber-optical switch using cam-micromotor driven by scratch drive actuators" Journal of Micromechanics and Microengineering V.15 (2005) pp. 118-123.*

* cited by examiner

*Primary Examiner*—Burton Mullins
(74) *Attorney, Agent, or Firm*—Alan Kamrath; Kamrath & Associates PA

(57) ABSTRACT

The present invention relates to a micro motor including a hub, a rib structure, an inner ring, an outer ring and at least two micro actuators, in which a top edge of the hub is projected outwardly to form a top lid, a plurality of bumps are provided between the rib structure and the top lid, and protruded limiting parts are disposed between the wall of the inner hole of the rib structure and the outer periphery of the hub so that the rib structure is in point contact with the hub and the top lid. Therefore, when the micro actuators drive the rib structure, the inner ring and the outer ring to rotate, mutual abrasion among those parts can be reduced to prolong the lifespan of the micro motor.

10 Claims, 10 Drawing Sheets

ABSTRACT# MICRO MOTOR

FIELD OF THE INVENTION

The present invention relates to a micro motor, and more particularly to the structure that can avoid abrasion and failure parts to prolong its lifespan.

BACKGROUND OF THE INVENTION

As shown in FIG. 1, the micro motor includes a hub 10, a rib structure 20, an inner ring 30, an outer ring and at least two micro actuators 50.

Furthermore, together with the reference to FIG. 2, low-stress (250 MPa) Si3N4 is deposited on a substrate 60 by LPCVD (Low Pressure Chemical Vapor Deposition) to serve as an insulation layer 61.

The hub therein is a stationary member fixed on the insulation layer 61 and takes the form of hollow ⊔-like disk, and its top edge is projected outwardly to form a top lid 11.

The rib structure 20 and the inner ring 30 are all in form of hollow ring. The inner ring 30 is located around the top lid 11, and the hole diameter of the inner ring 30 shall be slightly greater than the maximal outer diameter of the top lid 11. The rib structure 20 is fixed to the bottom portion of the inner ring 30 and is located beneath the top lid 1, its bottom surface has a plurality of bumps 21 for supporting the inner ring 30 to rotate above the insulation layer 51, and the diameter of the inner hole of the rib structure 20 shall be greater than the outer diameter of the hub 10 but smaller than the hole diameter of the inner ring 30 and the maximal outer diameter of the top lid 11, so that the top lid 11 is located above the rib structure 20 to serve as a stopper for preventing the rib structure 20 from coming off as a result of rotation.

The outer ring 40 is also in form of hollow ring, and the hole diameter of the outer ring 40 shall be far greater than the maximal outer diameter of the inner ring 30. A plurality of micro actuators 50 are located between the inner ring 30, the outer ring 40 and are connected with the inner ring 30 and the outer ring 40 by a respective cantilever beam 51, and a bushing 52 and an actuator plate 53 are disposed on each cantilever beam 51.

An upper and a lower electrodes 62, 63 are disposed on the insulation layer 61. When a fixed driving voltage is given, the actuator plate 53 is deflected due to the attraction of electrostatic force. After the given voltage is removed, the energy of the tensile stress stored in the actuator plate 53 pushes the micro actuator 50 to displace in completion of a step motion (the actuation concept of micro actuator is a prior art and is briefly depicted herein).

When the micro actuator 50 drives the rib structure 20, the inner ring 30 and the outer ring 40 to rotate, conventional micro motor will generate in non-directional wobble and deviation during rotation for sake of the gap existing between the hub 10 and the rib structure 20, which causes serious surface contact and abrasion among the rib structure 20, the hub 10 and the top lid 11. Especially when the size of micro actuator motor is usually less than 2×2 (mm), the surface contact and abrasion among the rib structure 20, hub 10 and top lid are prone to abrasion and failure of parts more easily.

SUMMARY OF THE INVENTION

In view of the foregoing concern, the present invention thus provide a micro motor, in which protruded limiting parts are disposed between the wall of the inner hole of the rib structure and the outer periphery of the hub, and a plurality of bumps are disposed between the rib structure and the top lid to make the rib structure in point contact with the hub and the top lid so as to avoid abrasion and failure of the parts.

The micro motor includes:

a hub being a stationary member, fixed on an insulation layer, taking a cylindrical form, having a hollow and ⊔-like disk, and having a top edge projected outwardly to form a top lid;

an inner ring being hollow and annular, located around the outer periphery of the top lid, and having a hole diameter slightly greater than a maximal outer diameter of the top lid;

a rib structure being hollow and annular, fixed to a bottom portion of the inner ring and located beneath the top lid to have a plurality of bumps disposed between the rib structure and the top lid, and having a diameter of an inner hole greater than an outer diameter of the hub but smaller than the hole diameter of the inner ring and the maximal outer diameter of the top lid so that the top lid is positioned above the rib structure as a stopper and at least three protruded limiting parts are disposed between the wall of the inner hole of the rib structure and the outer periphery of the hub;

an outer ring being hollow and annular and having a hole diameter far greater than a maximal outer diameter of the inner ring; and at least two micro actuators connected between the inner ring and the outer ring.

As such, when the micro actuators drive the rib structure, the inner ring and the outer ring to rotate, these parts are in point contact by the design of the limiting parts of the inner hole of the rib structure and the design of bumps disposed between the rib structure and the top lid, thereby lowering the wobble and deviation while rotating and reducing mutual abrasion among parts to prolong the lifespan of the micro motor.

DETAILED DESCRIPTION OF THE PREFERRED EMBODIMENT

Figure 1:
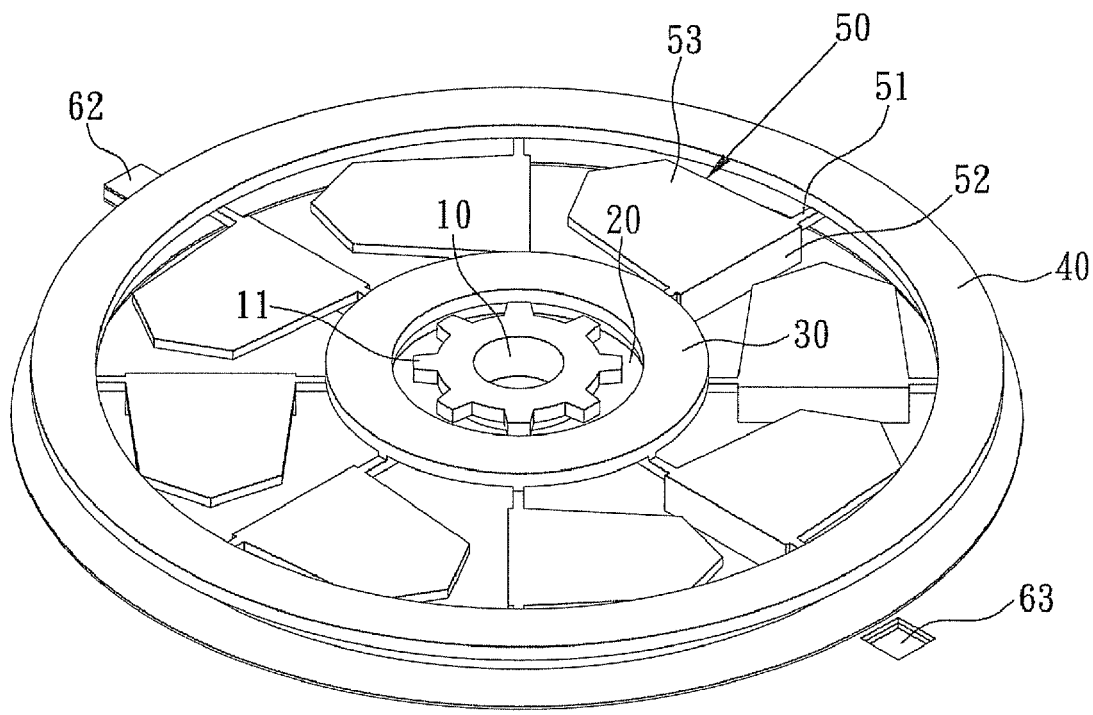
FIG. 1 is an external schematic view showing a conventional structure.
Figure 2:
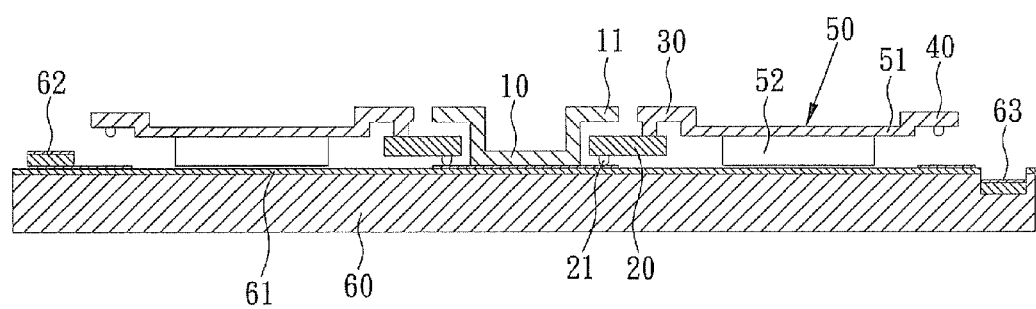
FIG. 2 is a cross-sectional view showing the conventional structure.
Figure 3:
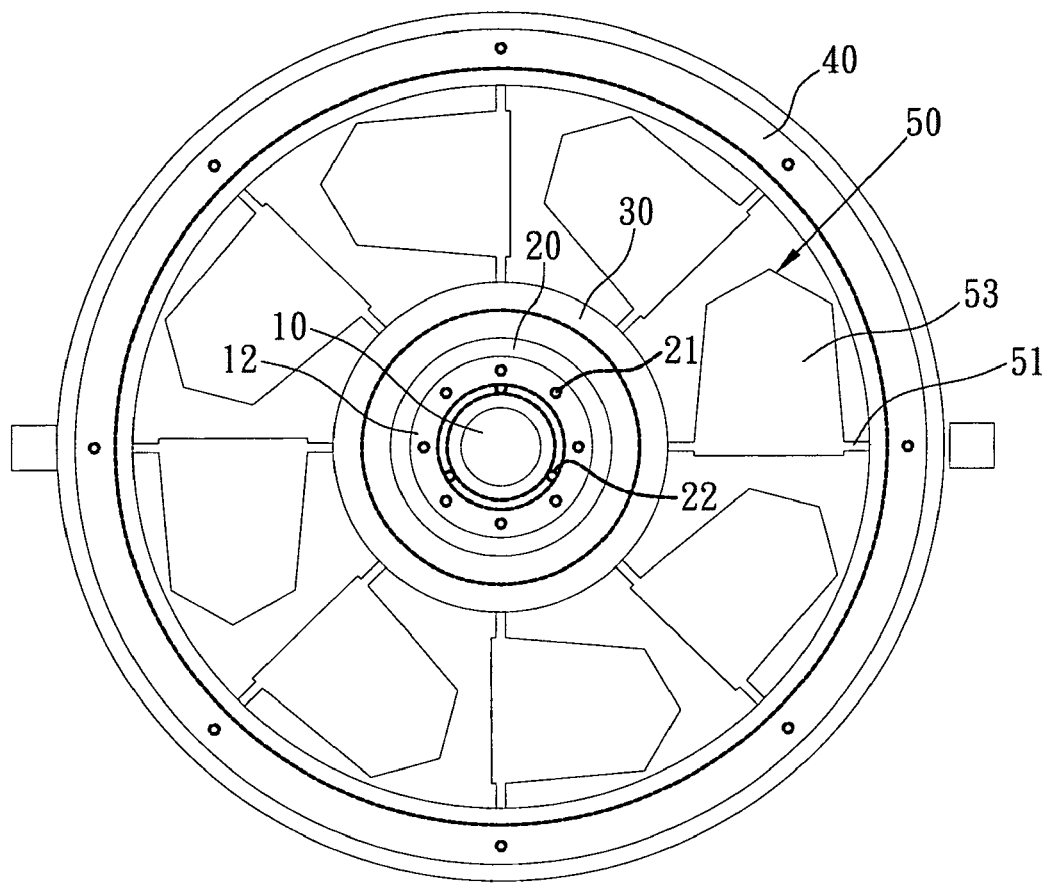
FIG. 3 is a plane view showing a first preferred embodiment of the present invention.
Figure 4:
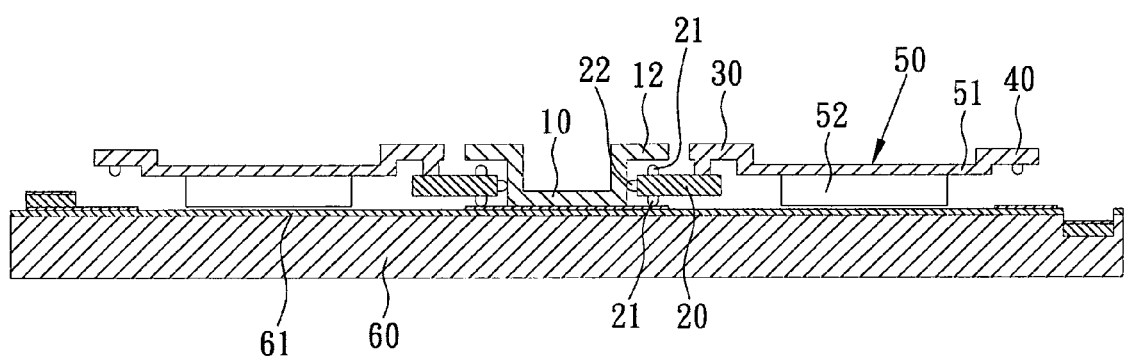
FIG. 4 is a cross-sectional view showing the first preferred embodiment of the present invention.
Figure 5:
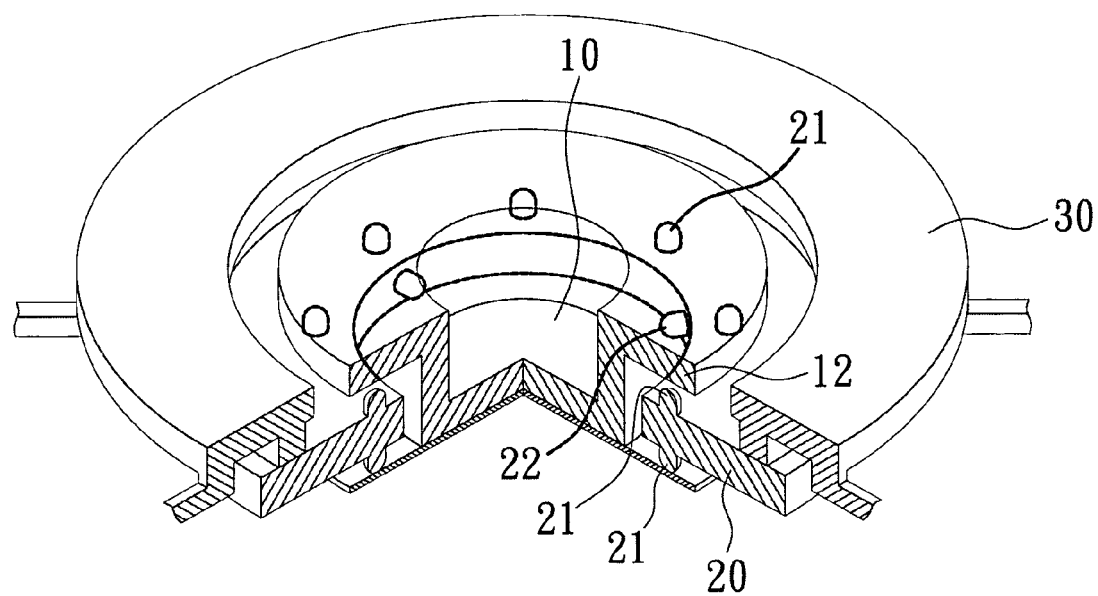
FIG. 5 is a partly cross-sectional view showing the first preferred embodiment of the present invention.

The present invention relates to one kind of micro motor as shown in FIG. 3, FIG. 4 and FIG. 5 which illustrate the first preferred embodiment of the present invention. The micro motor includes a hub 10, a rib structure 20, an inner ring 30, an outer ring and at least two micro actuators 50, in which the hub 10 is cylindrical and a stationary member and, its central portion takes the form of a hollow U-like disk, and its top edge is projected outwardly to form a top lid 12.

The rib structure 20 and the inner ring 30 are all in form of hollow ring. The inner ring 30 is located around the top lid 12, and the hole diameter of the inner ring 30 shall be slightly greater than the maximal outer diameter of the top lid 12. The rib structure 20 is fixed to the bottom portion of the inner ring 30 and is located beneath the top lid 12 for supporting the inner ring 30 to rotate. The inner hole diameter of the rib structure 20 shall be greater than the outer diameter of the hub 10 but smaller than the hole diameter of the inner ring 30 and the maximal outer diameter of the top lid 12, so that the top lid 12 can be positioned above the rib structure 20 as a stopper to prevent it from coming off as a result of its rotation. In addition, a plurality of bumps 21 are disposed between the rib structure 20 and the top lid 12 and can be disposed on either the rib structure 20 or the top lid 12, and at least three protruded limiting parts 22 (the limiting parts in FIG. 5 are in form of protruded column) are disposed between the wall of the inner hole of the rib structure 20 and the outer periphery of the hub 10. The limiting parts 22 can be disposed either on the wall of the inner hole of the rib structure 20 or on the outer periphery of the hub 10.

The outer ring 40 can be also in form of hollow ring, and the hole diameter of the outer ring 40 shall be far greater than the maximal outer diameter of the inner ring 30. A plurality of micro actuators 50 are located between the inner ring and the outer ring 40 and are connected with the inner ring 30 and the outer ring by a respective cantilever beam 51 therebetween, and a bushing 52 and an actuator plate 53 are further disposed on each cantilever beam 51.

Therefore, when the micro actuator 50 drives the rib structure 20, the inner ring 30 and the outer ring to rotate, mutual abrasion among parts can be alleviated since the limiting parts 22 are disposed on the wall of the inner hole of the rib structure 20 to result in point contact between the inner hole and the hub 10, and the limiting parts can also reduce the wobble and deviation during the course of rotation. Moreover, a plurality of bumps 21 are disposed between the rib structure 20 and the top lid 12 to prevent the rib structure 20 from directly hitting the top lid 12, thereby avoiding the abrasion and failure of parts and prolonging the lifespan of the micro motor.

Figure 6:
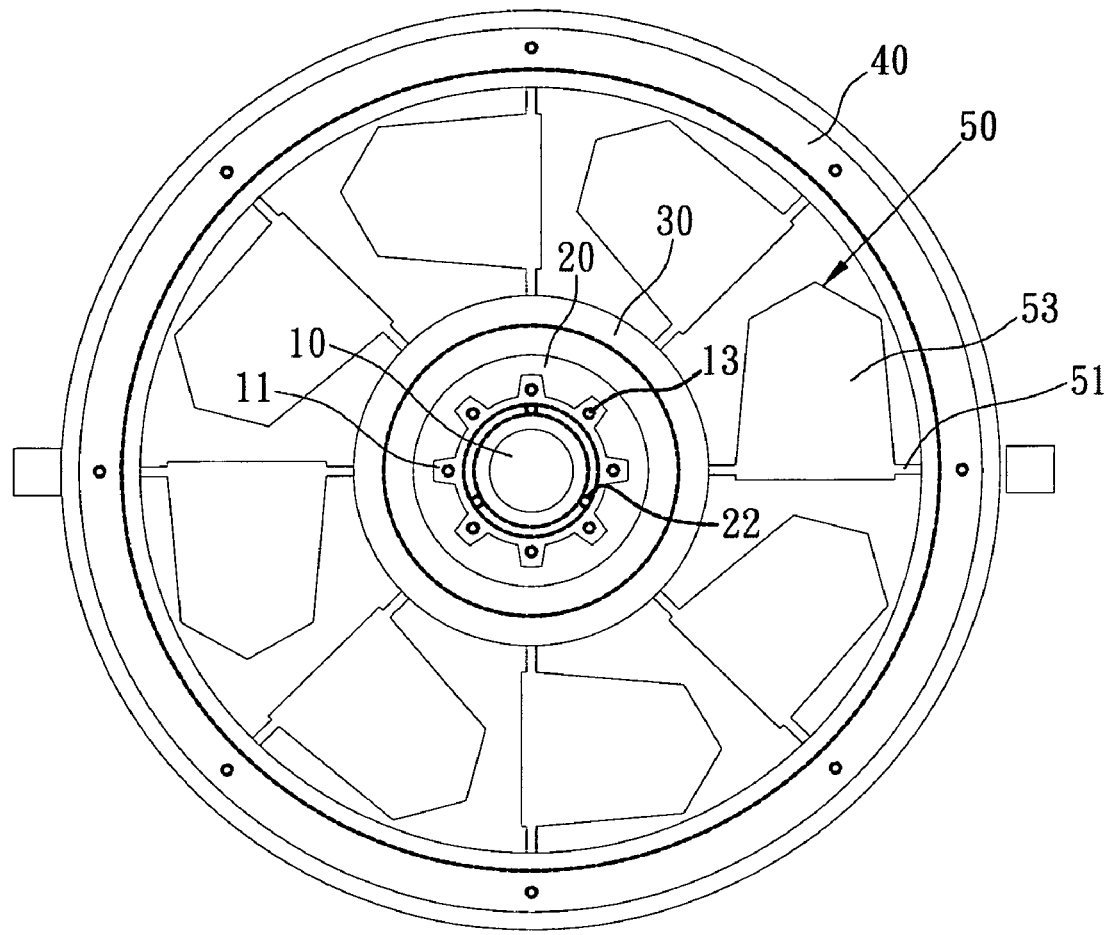
FIG. 6 is a plane view showing a second preferred embodiment of the present invention.
Figure 7:
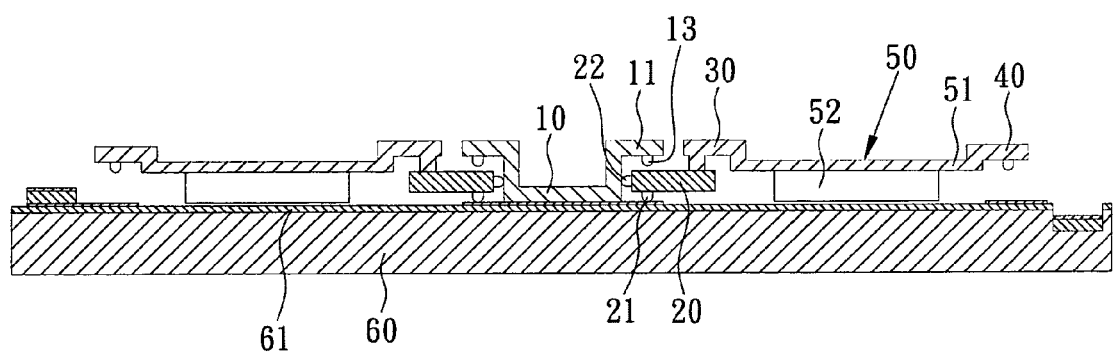
FIG. 7 is a cross-sectional view showing the second preferred embodiment of the present invention.
Figure 8:
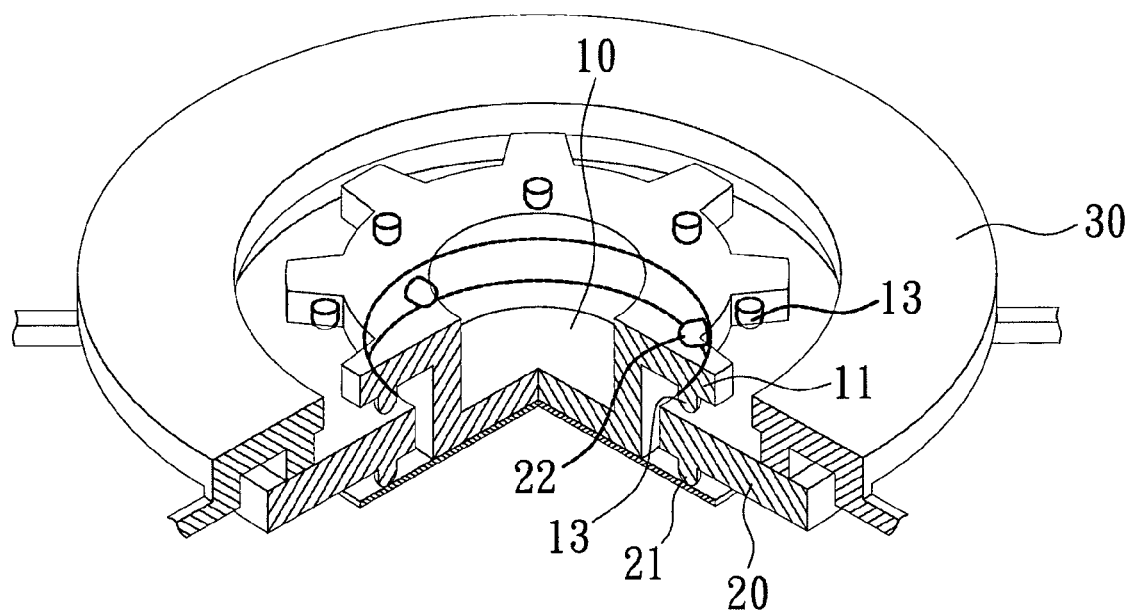
FIG. 8 is a partly cross-sectional view showing the second preferred embodiment of the present invention.

As shown in FIG. 6, FIG. 7 and FIG. 8 which illustrates the second preferred embodiment of the present invention. The micro motor includes a hub 10, a rib structure 20, an inner ring 30, an outer ring 40 and at least two micro actuators 50.

The top edge of the hub 10 is projected outwardly to form a top lid 11, the top lid 11 has at least two protruded rectangular teeth, and a plurality of bumps 13 are provided on the bottom surface of the top lid 11.

The rib structure 20 and the inner ring 30 are all in form of hollow ring. The inner ring 30 is located around the top lid 11, and the hole diameter of the inner ring 30 shall be slightly larger than the maximal outer diameter of the top lid 11. The rib structure 20 is fixed to the bottom portion of the inner ring 30 and is located beneath the top lid 11, and its bottom surface has a plurality of bumps 21 for supporting the inner ring 30 to rotate above the insulation layer 61. The diameter of the inner hole of the rib structure 20 shall be greater than the outer diameter of the hub 10 but smaller than the hole diameter of the inner ring 11 and the maximal outer diameter of the top lid 11 so that the top lid 11 can be positioned above the rib structure as a stopper to prevent the rib structure 20 from coming off due to its rotation, and at least three protruded limiting parts 22 (the limiting parts in FIG. 8 in form of protruded column) are disposed on the wall of the inner hole of the rib structure 20.

The outer ring 40 is also in form of hollow ring, and the diameter of the inner hole of the outer ring 40 shall be far greater than the maximal outer diameter of the inner ring 30. A plurality of micro actuators 50 are provided between the inner ring 30 and the outer ring and are connected with the inner ring 30 and the outer ring 40 by using its cantilever beam 51, and a bushing 52 and an actuator plate 53 are disposed on each cantilever beam 51.

Consequently, when the micro actuator 50 drives the rib structure 20, the inner ring 30 and the outer ring 40 to rotate, similarly, the design of limiting parts 22 on the inner hole of the rib structure 20 and the design of the bumps 21 between the rib structure 20 and the top lid 11 can be applied to reduce the mutual abrasion between parts and prolong the lifespan of the micro motor.

Figure 9:
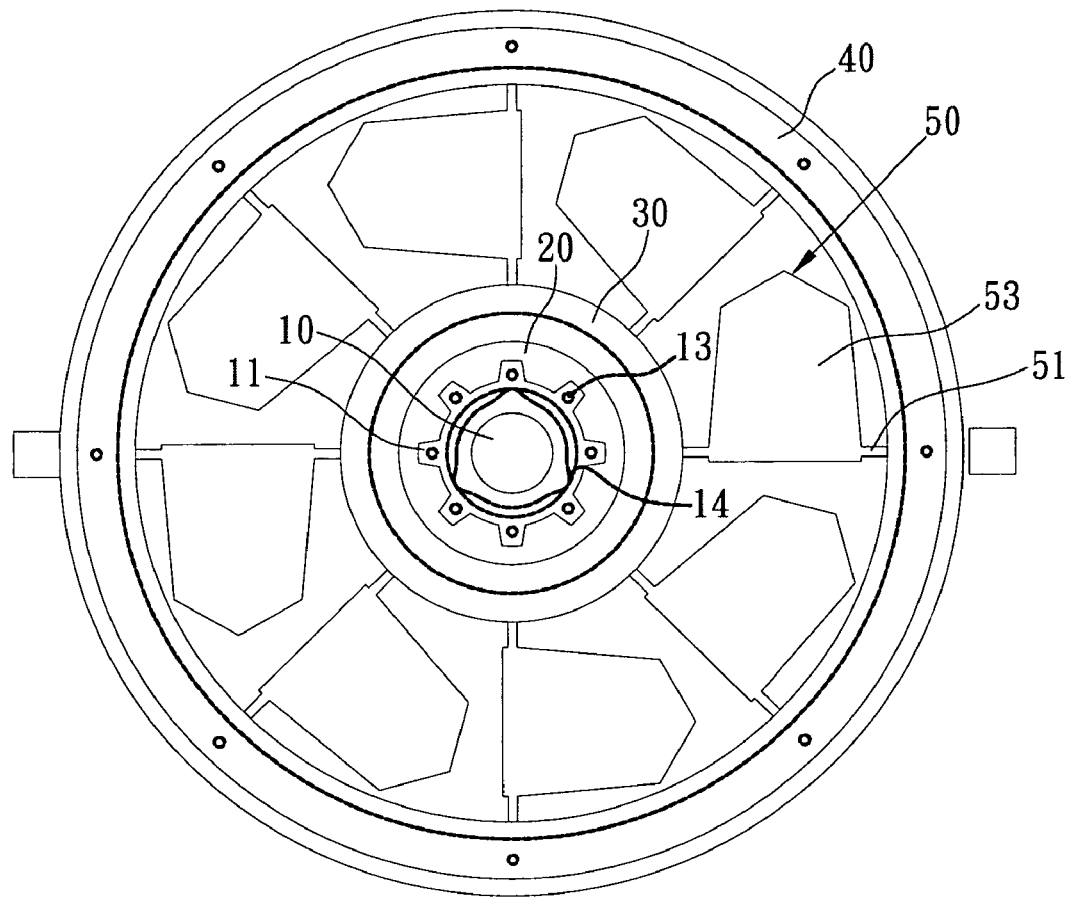
FIG. 9 is a plane view showing a third preferred embodiment of the present invention.
Figure 10:
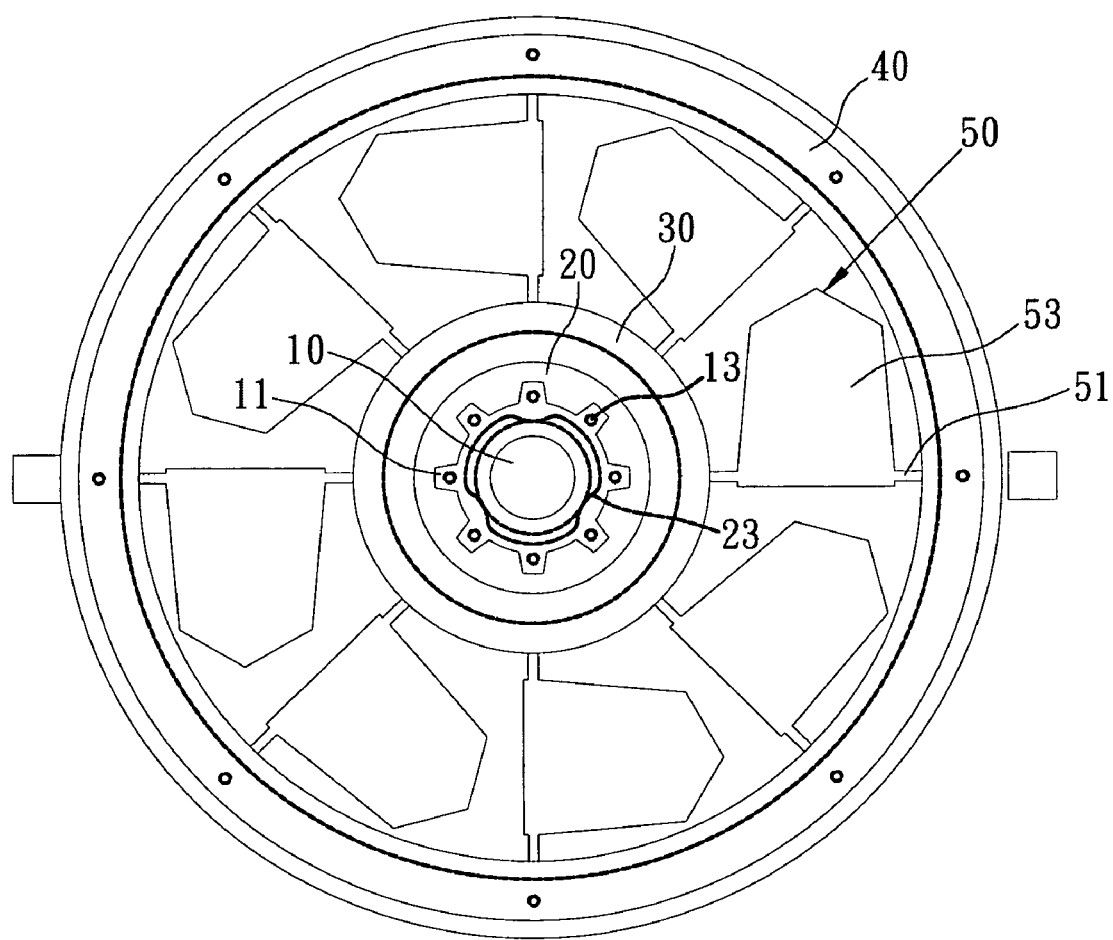
FIG. 10, is a plane view showing a fourth preferred embodiment of the present invention.

Furthermore, as shown in FIG. 9 and FIG. 10 which illustrates the third and fourth preferred embodiments of the present invention. At least three axially projected cylindrical limiting parts 14 (as shown in FIG. 9) are disposed on the outer periphery of the hub 10 of the micro motor. Alternatively, at least three axially projected cylindrical limiting parts 23 (as shown in FIG. 10) are disposed on the wall of the inner hole of the rib structure 20 in the micro motor to reduce the abrasive area and abrasion loss between the outer periphery of the hub 10 and the wall of the inner hole of the rib structure 20, thereby prolonging the lifespan of the parts.

From the above-mentioned characteristics those features not only have a novelty among similar products and a progressiveness but also have an industry utility.

While the invention has been described in terms of what is presently considered to be the most practical and preferred embodiments, it is to be understood that the invention needs not be limited to the circular disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A micro motor, comprising:

a hub configured as a stationary member having a cylindrical form and having a top edge projected outwardly to form a top lid;

an inner ring, the inner ring being hollow and annular, and located around an outer periphery of the top lid and having a hole diameter slightly greater than a maximal outer diameter of the top lid;

a rib structure, the rib structure being hollow and annular, and fixed to a bottom portion of the inner ring and located beneath the top lid to have a plurality of bumps disposed between the rib structure and the top lid, having a diameter of an inner hole greater than an outer diameter of the hub but smaller than the hole diameter of the inner ring and the maximal outer diameter of the top lid so that the top lid is positioned above the rib structure as a stopper and a plurality of protruded limiting parts are disposed between the wall of the inner hole of the rib structure and an outer periphery of the hub;

an outer ring, the outer ring being hollow and annular, and having a hole diameter greater than a maximal outer diameter of the inner ring; and at least two micro actuators connected between the inner ring and the outer ring.

2. The micro motor as set forth in claim 1, wherein the limiting parts are in the form of an axially protruded column.

3. The micro motor as set forth in claim 1, wherein the limiting parts are in the form of a protruded column.

4. The micro motor as set forth in claim 1, wherein the limiting parts are disposed on the wall of the inner hole of the rib structure.

5. The micro motor as set forth in claim 1, wherein the limiting parts are disposed on the outer periphery of the hub.

6. The micro motor as set forth in claim 1, wherein there are at least three limiting parts.

7. The micro motor as set forth in claim 1, wherein the bumps are disposed on a top surface of the rib structure.

8. The micro motor as set forth in claim 1, wherein the bumps are disposed on a bottom surface of the top lid.

9. The micro motor as set forth in claim 1, wherein the micro actuators are connected between the inner ring and the outer ring by a respective cantilever beam, and a bushing and an actuator plate are disposed on each cantilever beam.

10. The micro motor as set forth in claim 1, wherein a plurality of bumps are provided on a bottom surface of the rib structure.

* * * * *